(12) United States Patent
Cashdollar et al.

(10) Patent No.: US 11,554,683 B2
(45) Date of Patent: Jan. 17, 2023

(54) CHARGING SYSTEM FOR ELECTRIC VEHICLES

(71) Applicant: Proterra Operating Company, Inc., Burlingame, CA (US)

(72) Inventors: Hayley Cashdollar, San Mateo, CA (US); Dustin Grace, San Francisco, CA (US)

(73) Assignee: Proterra Operating Company, Inc., Burlingame, CA (US)

( * ) Notice: Subject to any disclaimer, the term of this patent is extended or adjusted under 35 U.S.C. 154(b) by 146 days.

(21) Appl. No.: 16/817,813

(22) Filed: Mar. 13, 2020

(65) Prior Publication Data

US 2020/0290474 A1    Sep. 17, 2020

Related U.S. Application Data

(60) Provisional application No. 62/818,884, filed on Mar. 15, 2019.

(51) Int. Cl.
*H02J 7/00*     (2006.01)
*B60L 53/62*    (2019.01)
*H02J 7/02*     (2016.01)
*B60L 58/12*    (2019.01)

(52) U.S. Cl.
CPC .............. *B60L 53/62* (2019.02); *B60L 58/12* (2019.02); *H02J 7/0013* (2013.01); *H02J 7/0045* (2013.01); *H02J 7/0047* (2013.01); *H02J 7/02* (2013.01)

(58) Field of Classification Search
CPC .......... B60L 53/62; B60L 58/12; H02J 7/0013
USPC ......................................................... 320/109
See application file for complete search history.

(56) References Cited

U.S. PATENT DOCUMENTS

| | | | |
|---|---|---|---|
| 8,324,858 B2 | 12/2012 | Hill et al. | |
| 9,321,364 B1 | 4/2016 | Ashworth et al. | |
| 9,352,658 B2 | 5/2016 | Morris et al. | |
| 9,669,719 B1* | 6/2017 | Gerber ................. | H02J 7/0027 |
| 9,718,367 B2 | 8/2017 | McGrath et al. | |
| 2011/0144823 A1* | 6/2011 | Muller ...................... | B60L 3/04 |
| | | | 700/297 |
| 2011/0302078 A1* | 12/2011 | Failing .................. | B60L 53/305 |
| | | | 705/39 |
| 2011/0304304 A1* | 12/2011 | Ankyu .................... | H02J 7/342 |
| | | | 320/162 |
| 2013/0257146 A1* | 10/2013 | Nojima ................. | B60L 53/305 |
| | | | 307/9.1 |
| 2015/0097526 A1* | 4/2015 | DeDona ................... | B60L 3/00 |
| | | | 320/109 |
| 2016/0107530 A1* | 4/2016 | Roberts .................. | B60L 53/16 |
| | | | 320/109 |
| 2018/0037121 A1* | 2/2018 | Narla ...................... | B60L 53/53 |

FOREIGN PATENT DOCUMENTS

WO    WO 2019/071154 A1    4/2019

* cited by examiner

*Primary Examiner* — Samuel Berhanu
(74) *Attorney, Agent, or Firm* — Bookoff McAndrews, PLLC

(57) ABSTRACT

An electric vehicle charging system includes a power distributing system configured to receive power from a power control system and selectively direct the power to one of a plurality of power dispensers coupled to the power distribution system.

20 Claims, 5 Drawing Sheets

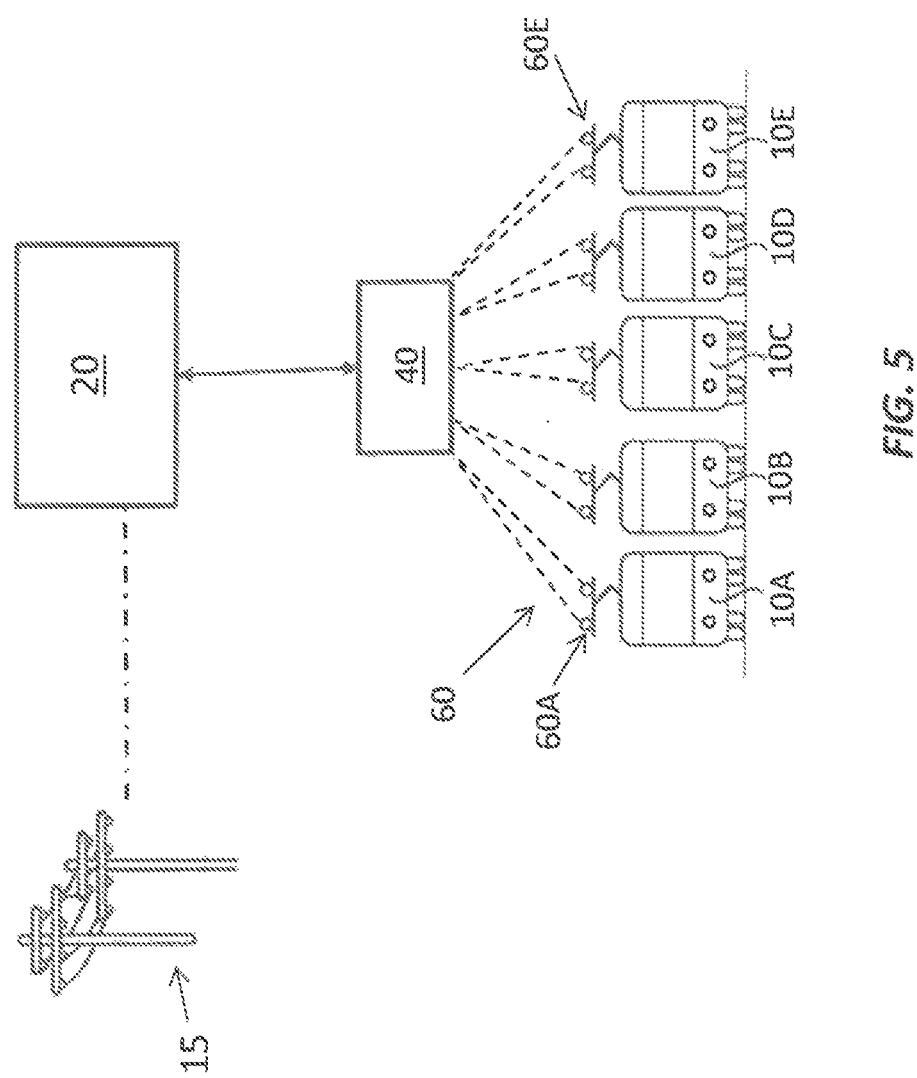

CHARGING SYSTEM FOR ELECTRIC VEHICLES

CROSS-REFERENCE TO RELATED APPLICATIONS

This application claims the benefit of U.S. Provisional Application No. 62/818,884, filed Mar. 15, 2019, the disclosure of which is incorporated herein by reference in its entirety.

TECHNICAL FIELD

The current disclosure relates to a charging system for electric vehicles.

BACKGROUND

Electric vehicles, such as buses, cars, trucks, etc. are charged at a charging station to recharge their batteries. In the case of a fleet of electric vehicles, multiple vehicles may be recharged at the same time (e.g., when they are parked overnight at a depot, when multiple vehicles pull into a charging station, etc.). In the case of a large fleet (such as, for example, a fleet of electric buses), a reduction in operating costs can be achieved by reducing the infrastructural and other costs associated with charging (such as, for example, decreasing number of chargers, increasing the number of vehicles that can be charged at the same time, etc.). Embodiments of the current disclosure may result in a decrease in charging related costs for electric vehicles. The scope of the current disclosure, however, is defined by the attached claims, and not by the ability to solve any specific problem.

SUMMARY

Embodiments of the present disclosure relate to, among other things, charging system for electric vehicles. In one embodiment, an electric vehicle charging system is disclosed. The charging system includes a power distributing system configured to receive power from a power control system and selectively direct the power to one of a plurality of power dispensers coupled to the power distribution system.

In one embodiment, an electric vehicle charging system is disclosed. The electric vehicle charging system may include a power control system configured to receive power from a utility grid, a power distribution system configured to receive power from the power control system, and a first power dispenser and a second power dispenser coupled to the power distribution system. The first power dispenser and the second power dispenser may each be configured to direct power to an electric vehicle. And, the power distribution system may be configured to selectively direct the received power to one of the first and second power dispensers.

In another embodiment, a method for charging electric vehicles is disclosed. The method may include releasably coupling a first power dispenser to a first electric vehicle and a second power dispenser to a second electric vehicle. The first and second power dispensers may be coupled to a power distribution system, and the power distribution system may be coupled to a power control system. The method may also include directing power from the power control system to the power distribution system, and selectively directing power from the power distribution system to the first power dispenser without directing power to the second power dispenser.

In another embodiments, a power distribution system configured to charge a first electric vehicle and a second electric vehicle is disclosed. The power distribution system may include a first power dispenser and a second power dispenser. The power distribution system may also include a first contactor, a second contactor, and a control unit. The first contactor may electrically couple the first power dispenser to a power control system and the second contactor may electrically couple the second power dispenser to the power control system. The control unit may be configured to receive power from the power control system, receive information regarding the first electric vehicle coupled to the first power dispenser and the second electric vehicle coupled to the second power dispenser. The control unit may also be configured to determine to charge the first electric vehicle prior to the second electric vehicle based on the received information, selectively direct power to the first dispenser coupled to the first electric vehicle by activating the first contactor and deactivating the second contactor, and as a result of determining that the first electric vehicle is charged, selectively direct power to the second dispenser coupled to the second electric vehicle by activating the second contactor and deactivating the first contactor.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 5 is a schematic illustration of an exemplary electric vehicle charging system of the current disclosure according to one embodiment.

DETAILED DESCRIPTION

The present disclosure describes a charging system for electric vehicles. While principles of the current disclosure are described with reference to specific types of electric vehicles, it should be understood that the disclosed charging systems and methods may be used in any electric vehicle application.

Figure 1:
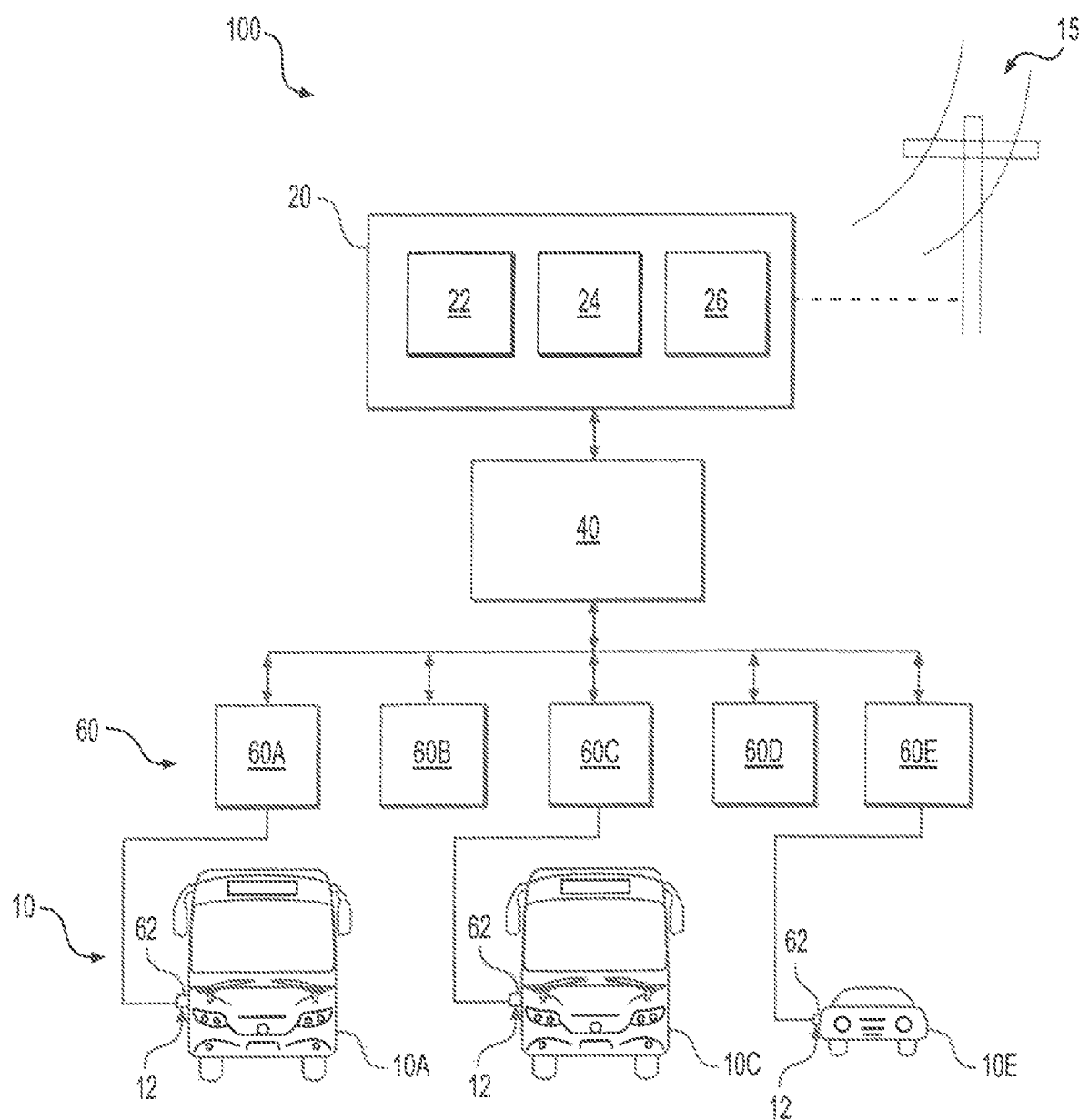
FIG. 1 is a schematic illustration of an exemplary electric vehicle charging system of the current disclosure according to one embodiment.

FIG. 1 schematically depicts an embodiment of electric vehicle charging system 100. The electric vehicle charging system 100 may include a plurality of charge dispensers 60 (dispensers 60A-60E) electrically coupled to a power control system (PCS 20) through a power distributing system (PDS 40). Any number to charge dispensers 60 may be connected to PDS 40. Each charge dispenser 60 may include a cable with a connector 62 (or another plug-in interface).

Connector 62 may be connected (e.g., plugged in) to a charge port 12 of an electric vehicle (EV 10) to charge EV 10. As illustrated in FIG. 1, EV 10 may include any type of electric vehicle (car, bus, truck, motor cycle, etc.). That is, the dispensers 60 of charging system 100 may be configured to charge different types of electric vehicles (e.g, buses 10A, 10B and car 10C). During charging, connector 62 directs electric power from PCS 20 to EV 10 to recharge the battery system (not shown) of EV 10. In some embodiments, charge port 12 may be a standardized charge port (e.g., SAE J1772 charge port, ChadeMo charge port, etc.) that is configured to receive a corresponding standardized connector 62 (e.g., SAE J1772 connector). As would be recognized by people of ordinary skill in the art, SAE J1772 charge port and SAE J1772 connector are a standardized pair of electrical connectors for electric vehicles in the United States. However, a standardized charge port and connector are not requirements. As would be recognized by a person skilled in the art, any suitable now-known or future-developed connector and plug (standardized or non-standard) may be used as connector 62 and charge port 12. In some embodiments, different dispensers 60 may include different types/configurations of connectors 62 (e.g., connector 62 of dispenser 60A may have a different connector than dispenser 60B, etc.) to charge EVs 10 having corresponding types of charge ports 12. In some embodiments, a single dispenser (e.g., dispenser 60A, 60B, etc.) may have multiple connectors (e.g., having different configurations) to charge EVs 10 having different configurations of charge ports 12 at that dispenser. Exemplary charge ports and corresponding connectors are described in U.S. Pat. No. 9,669,719, which is incorporated herein by reference in its entirety.

It should be noted that, although EV 10 is described as having a charge port 12, and dispenser 60 is described as having a corresponding connector 62 that plugs into the charge port 12, this connection method is only exemplary. Any known method may be used to connect an EV to a dispenser. In some embodiments, EV 10 may include a different type of charging interface (in addition to, or in place of, charge port 12) that interfaces with a corresponding charging interconnection of a charging station. For example, the charging interface of EV 10 may include charge-receiving electrodes positioned on the roof (or another surface such as the side surface) of EV 10, and the charging interconnection (of charging station) may include charging electrodes attached to an inverted pantograph that descends (or extends) to bring the charging electrodes in contact with the charge-receiving electrodes of EV 10. See FIG. 4B. In some embodiments, the charge-receiving electrodes may be attached to a pantograph attached to the roof of EV 10. To charge EV 10, the roof-top pantograph raises up to bring the charge-receiving electrodes on the pantograph in contact with charging electrodes of the charging station. See FIGS. 4A and 5. In some embodiments, these charging electrodes may be in the form of wires that extend over a parking area for EVs in charging station. In general, the charging interface of EV 10 and the corresponding charging connection of the charging station may accommodate any type of conductive charging. Exemplary charging interfaces and corresponding charging connections that may be used in charging system 100 are described in International application PCT/US2018/054649, filed Oct. 5, 2018; U.S. Pat. Nos. 8,324,858; 9,352,658; 9,321,364; and 9,718,367, all of which are incorporated herein by reference in their entireties.

In some embodiments, electric current from a utility grid 15 (e.g., single phase or three-phase AC current from a utility company that supplies power in a geographic locality) may be directed to PCS 20 (power control system). This AC current may be converted to DC current at PCS 20 and distributed to the various dispensers 60 (i.e., dispensers 60A-60E) via PDS 40 (power distributing system). PCS 20 may include electrical components (e.g., transformer, rectifier, power converter, switches, safety mechanisms, etc.) that convert the AC grid current to the DC current. For example, in some embodiments, the utility grid 15 may provide AC current having at a high voltage, for example, at a voltage between about 12-33 kV, to PCS 20. A transformer in PCS 20 may step down this voltage to a lower voltage, e.g., 750V, and a rectifier of PCS 20 may convert the AC current to DC current. This DC current may then be provided to one or more dispensers 60 as will be described below. In some embodiments, PCS 20 may include (or may be coupled to) a secondary power delivery system 24, for example, to provide backup power to EV 10. Power from secondary delivery system 24 may be used to charge EV 10 at times of need (e.g., grid shutdown, voltage fluctuations. etc.) and/or to reduce cost (e.g., during times of high energy cost). Secondary power delivery system 24 may include any type of power generation device (e.g., solar panels, wind turbines, gas/diesel generators, etc.) or power storage device (e.g., capacitors, external battery packs, etc.) that can provide power to EV 10. In some embodiments, power from secondary power delivery system 24 may also be directed to the buses 10 via PDS 40 and dispensers 60. PCS 20 may include a control unit 22 configured to manage the delivery of power to the dispensers 60. For example, control unit 22 may selectively direct power from utility grid 15 or secondary power deliver system 24 to the dispensers 60 based on power availability, energy cost, etc. PCS 20 may also include a communications system 26 with components configured to communicate with an external source (e.g., an EV 10, a control station that controls operation of a fleet of EVs 10, utility company, etc.) via a wired or a wireless (e.g., cellular network, internet, etc.) connection. Using communications system 26, PCS 20 may communicate with the external source to transmit data (e.g., current state of charge of EV 10, total energy consumed in charging EVs, details (identification number, etc.) of the EVs 10 being charged, etc.) and to receive information (e.g., energy cost at that time from utility company, schedule and other information of EVs 10, etc.).

PDS 40 may be configured to receive power from PCS 20 and direct the power to the one or more dispensers 60 (e.g., dispensers 60A-60E) connected to it. In some embodiments, PDS 40 may direct power to dispensers 60 sequentially or in a serial manner. That is, in such embodiments, PDS 40 directs power to only one of the dispensers 60 connected to it at one time. If only one of the dispensers 60 (e.g., dispenser 60A) has an EV 10 connected to it, PDS 40 will direct power to only dispenser 60A. In some embodiments, even if EVs 10 are connected to multiple dispensers 60 (e.g., dispensers 60A, 60C, and 60E as illustrated in FIG. 1), PDS 40 will direct power to only one of these dispensers (e.g., dispenser 60A) at a time to charge the EV 10 (i.e., EV 10A) connected to dispenser 60A. After charging EV 10A (or after EV 10A has been charged to a sufficient degree), PDS 40 may stop directing power to dispenser 60A and direct power to one of dispensers 60C or 60E. As will be described in more detail later, a control unit of PDS 40 may selectively direct power to one of the dispensers (i.e., 60A, 60C, or 60E) based on a schedule or a priority. It is also contemplated that, in some embodiments, PDS 40 may distribute the power (from PCS 20) to multiple (some or all) dispensers 60 in a parallel manner (i.e., at the same time).

Figure 2:
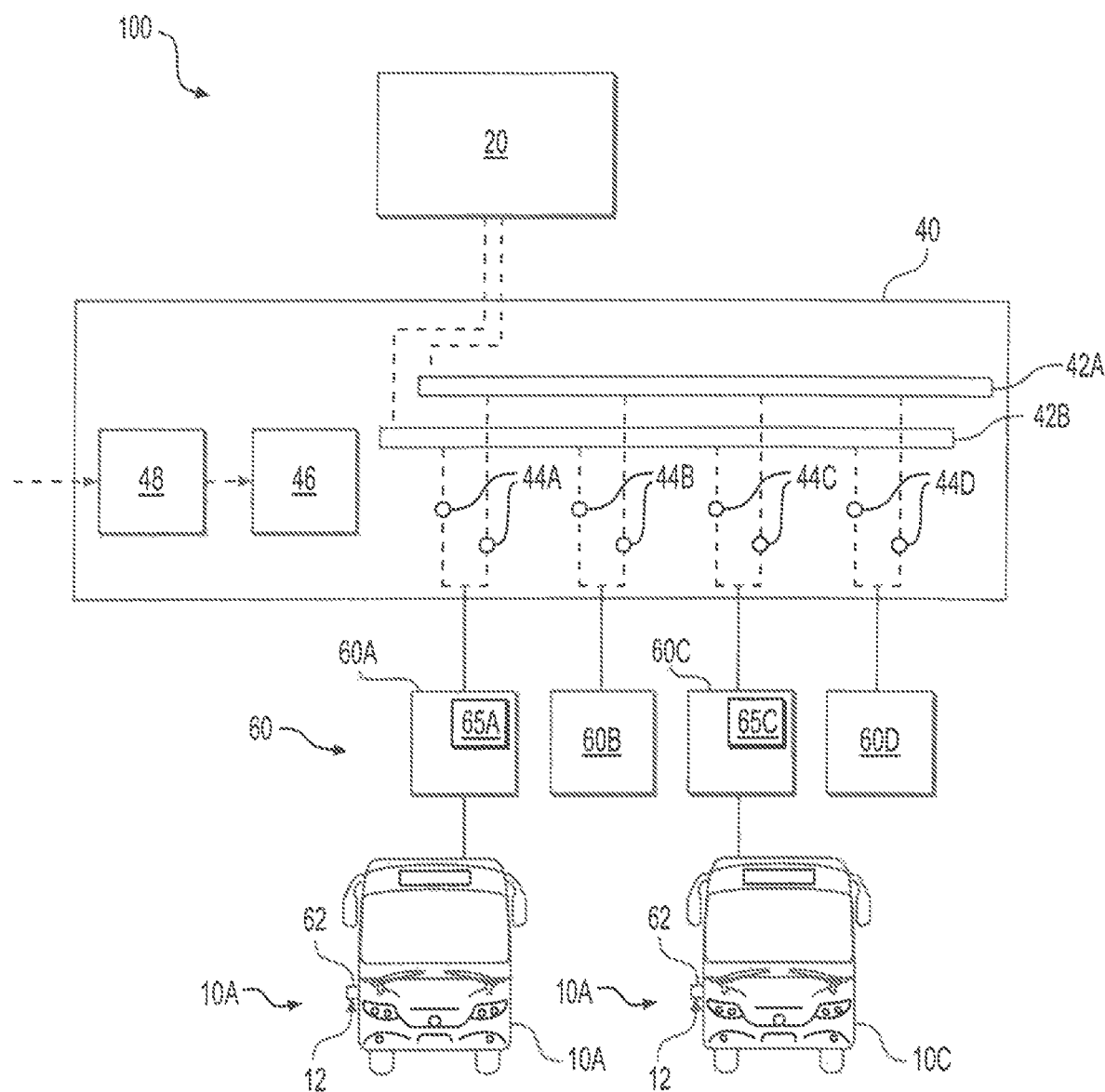
FIG. 2 is a schematic illustration of a power distribution system (PDS) of the electric vehicle charging system of FIG. 1 in an exemplary embodiment according to one embodiment.

FIG. 2 is a schematic illustration of PDS 40 having four dispensers 60A, 60B, 60C, and 60D connected thereto. It should be noted that the illustrated number of dispensers 60 in FIG. 2 is only exemplary and any number of dispensers can be connected to PDS 40. PDS 40 includes bus bars 42A, 42B that receive power from PCS 20. For example, bus bar 42A may be connected to the positive power output terminal (DC+) of PCS 20 and bus bar 42B may be connected to the negative power output terminal (DC−) of PCS 20. As illustrated in FIG. 2, these bus bars 42A, 42B may be connected to each dispenser 60A-60D via a pair of contactors 44A, 44B, 44C, 44D, etc. provided between bus bars 42A, 42B and each dispenser 60. Power flow from bus bars 42A, 42B to a dispenser 60 may be stopped by opening the pair of contactors (referred to herein as contactor) associated with that dispenser 60. For example, opening contactor 44A will terminate power flow to dispenser 60A, opening contactor 44C will terminate power flow to dispenser 60C, etc. Likewise, closing contactor 44A will allow power to flow from bus bars 42A, 42B to dispenser 60A, etc.

PDS 40 includes a control unit 46 (e.g., a microcontroller, etc.) configured to control and monitor the operations of PDS 40. Among other functions, control unit 46 may selectively open and close (i.e., selectively activate) contactors 44A, 44B, 44C, 44D. For example, by selectively activating contactor 44A (i.e., closing contactor 44A and opening contactors 44B, 44C, and 44D), control unit 46 selectively directs power from PCS 20 to dispenser 60A. Similarly, by selectively activating contactor 44C (i.e., closing contactor 44C and opening contactors 44A, 44B, and 44D), control unit 46 selectively directs power from PCS 20 to dispenser 60C. Thus, by selectively activating contactors 44A-44D, control unit 46 selectively directs power to one of dispensers 60A-60D to charge the EV 10 coupled to that dispenser. PDS 40 may selectively energize dispensers 60 in any order by activating the corresponding contactors (e.g., 60A→60B→60C→60D→60E; 60C→60A→60E→60D→60B, etc.). As will be described in more detail below, control unit 46 may selectively activate contactors 44A-44D based on a priority for charging the EVs 10 connected to dispensers 60A-60D.

PDS 40 may include a communications system 48 configured to communicate (wirelessly or wired) with an external source (e.g., PCS 20, dispenser 60, a charging controller located in or remote from charging system 100, etc.). The data/information communicated to (e.g., received by) communications system 48 may be indicative of the priority for charging the EVs 10 connected to dispensers 60A-60D (i.e., EVs 10A and 10B). For example, in embodiments where charging system 100 is configured to charge EVs of a fleet (e.g., a fleet of electric transit buses (EV 10A, EV 10B, etc.) operating in fixed routes in a city, etc.), a charging controller (e.g., a control system housed in a control center that manages the operation of the fleet) may determine the priority for charging the EVs (based on factors such as, for example, schedule of the buses, how much charge is needed, energy cost, if a bus is late, etc.) and send instructions to PDS 40 indicating which EV 10 (e.g., EV 10A) is to be charged first, which EV 10 (e.g., EV 10B) to charge second, etc. In embodiments where an EV of a fleet is being charged at charging system 100, the control system of the fleet control center may be aware of the schedule of all the EVs and therefore may be well suited to prioritize the charging of the EVs being charged at the different dispensers. In some embodiments, these instructions may also include charging parameters (e.g., how long to charge, the charge current, etc.) for each EV 10. Based on data/information received by communications system 48, control unit 46 may determine which of the dispensers 60A, 60B, 60C, or 60D to activate. In some embodiments, control unit 46 (or another control unit associated with charging system 100) may determine the priority of charging based on other factors. For example, in some embodiments, the priority for charging may be based on default schedule programmed in control unit 46 (e.g., a first-in, first-out order). That is, the EV (e.g., EV 10A) that is connected to a dispenser 60 (i.e., dispenser 60A) first will be charged first, and the EV that connected to a dispenser 60 next will be charged next, etc.

Each dispenser 60 may include components configured to receive power from PDS 40 and direct the power to EV 10. In some embodiments, some or all dispensers 60 may also be configured for bi-directional power transfer (i.e., configured to transfer power from PCS 20 to EV 10 and transfer power from EV 10 to PCS 20). Each dispenser 60 may also include components (e.g., isolation transformer, etc.) configured to isolate an EV 10 (e.g., EV 10) connected to that dispenser (e.g., dispenser 60A) from EVs (e.g., EV 10C) connected to other dispensers (e.g., dispenser 60C). Each dispenser 60 may also include a control unit configured to communicate with the EV connected to that dispenser and control units 22, 48 (of PCS 20 and PDS 40) to control the charging process. For example, control unit 65A of dispenser 60A may communicate with EV 10A (or a charge controller of EV 10A) to determine (for example) the current state of charge (SOC) of EV 10A. Control unit 65A may then determine the parameters for charging EV 10A (e.g., voltage, current, etc. for charging) based on its SOC, and instruct control unit 22 of PCS 20 (and/or control unit 46 of PDS 40) to deliver power having the determined parameters (voltage, magnitude, etc.) to dispenser 60A to charge EV 10A. In some embodiments, when power is directed from PCS 20 to dispenser 60A (i.e., when contactor 44A of PDS 40 is activated), control unit 65A acts as the master controller and control unit 22 of PCS 20 acts as the slave controller. That is, control unit 22 follows the instructions of control unit 65A. Similarly, control unit 65C of dispenser 60C determines the charge current and/or voltage for charging EV 10C based on its SOC. And, when contactor 44C of PDS 40 is activated, control unit 65C acts as the master control unit and instructs control unit 22 (of PCS 20) to direct power having the determined parameters to EV 10C (i.e., control unit 22 acts as the slave controller).

In some embodiments, some of the functions described above with reference to one control unit (e.g., control unit 22, 46, 65A) may be performed by another control unit. In some embodiments, some of these control units (e.g., control unit 22, 46, 65A) may be combined. In general, these control units may include memory and logic devices and may be configured to store data and perform arithmetic operations on data. These control units (collectively or individually) may control the charging of EVs 10 connected to the charging system 100 and the discharge of power from these EVs 10 to the utility grid 15 (referred to as vehicle-to-grid or V2G). That is, in some embodiments, the control units of charging system 100 are not only configured to pull power from utility grid 15 to charge EVs 10, but are also configured to feed power back into utility grid 15 from EVs 10. In some embodiments, these control units may also control the discharge of power from some EVs 10 (e.g., EV 10A) to the utility grid 15 while directing power from the grid 15 to other EVs 10 (e.g., EV 10C).

It should be noted that although PCS 20 is described as converting AC current to DC current and then directing the DC current to PDS 40, this is not a requirement. In some embodiments, PCS 20 receives DC current as input and outputs DC current to PDS 40. For example, a secondary power source (e.g., including a bank of battery packs, a solar cell array, etc.) may input DC current into PCS 20, and PCS may direct that DC current (either without any change or after modifying (e.g., stepping down/stepping up voltage, etc.) the current) to PDS 40. It is also contemplated that, in some embodiments, PCS 20 may direct AC current to PDS 40. In such embodiments, either PDS 40 or inverters positioned upstream (e.g., between PCS 20 and PDS 40) or downstream of PDS 40 (e.g., in dispenser 60 or between dispenser 60 and PDS 40) may convert the AC current to DC current.

Figure 3:
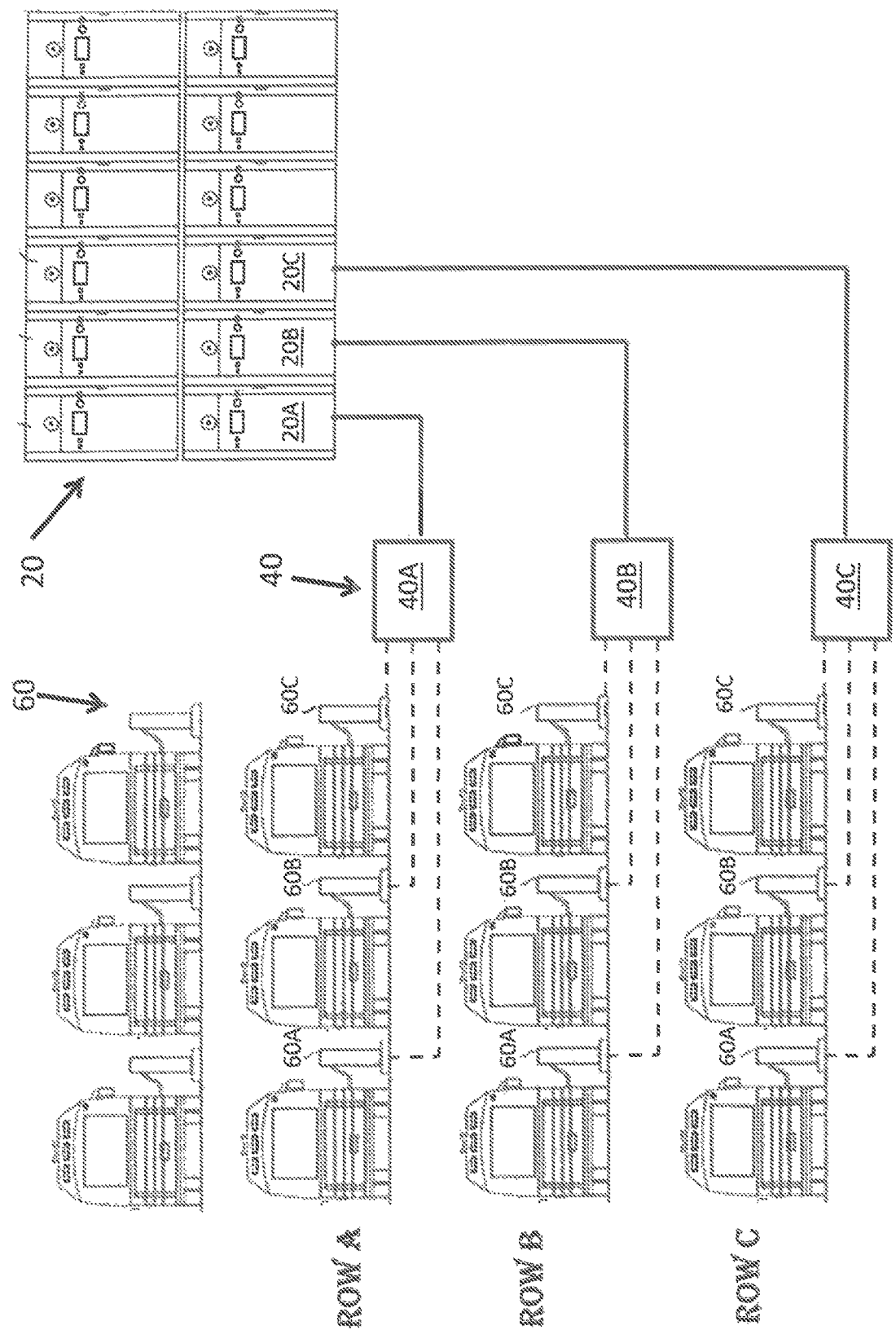
FIG. 3 is a schematic illustration of multiple electric vehicles (EVs) in an exemplary depot according to one embodiment.
Figure 4A:
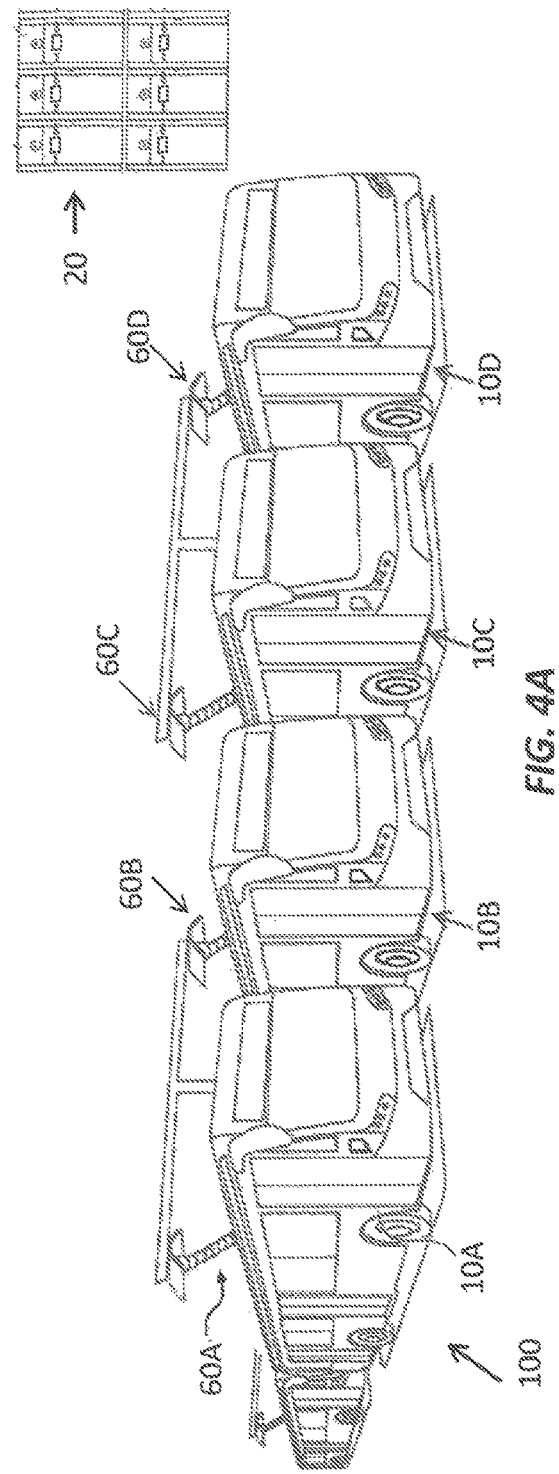
FIGS. 4A-4B are schematic illustrations of multiple electric vehicles (EVs) in exemplary depots according to some embodiments.
Figure 4B:
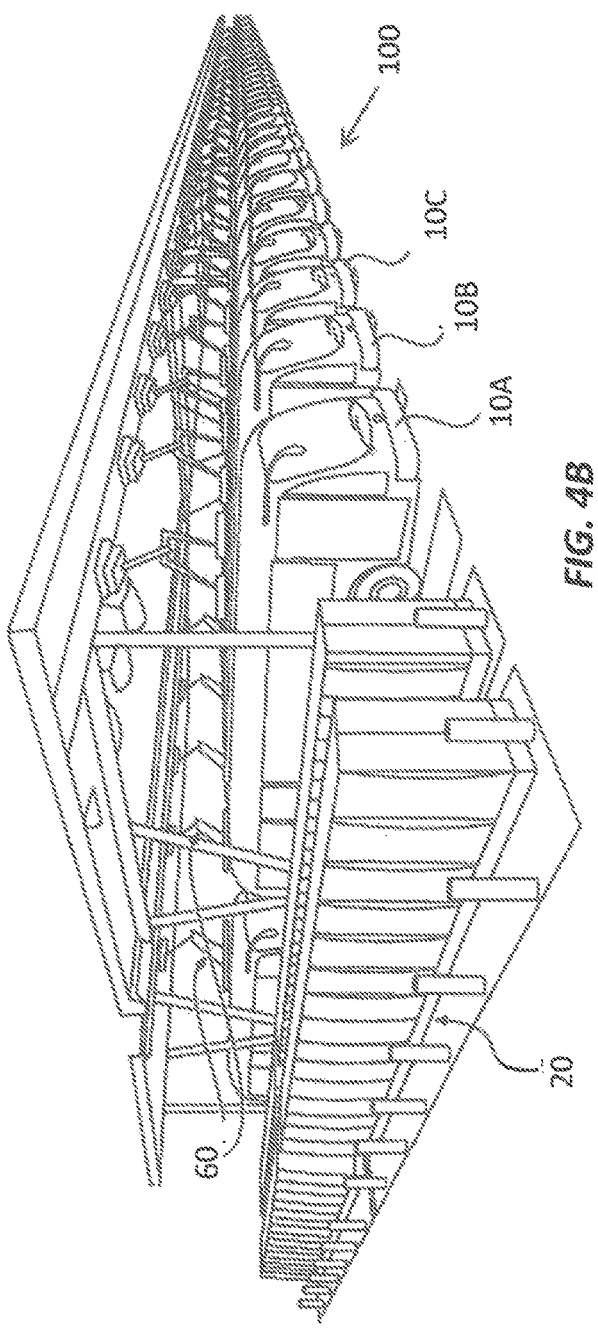

In an application where charging system 100 is used to charge a fleet of vehicles, such as, for example, a fleet of electric buses (e.g., electric school buses), many of these buses may be parked at a depot for extended periods (overnight, between shifts, etc.) of time. For example, electric school buses may be parked in the depot when they are not used to transport students to school and return students home. FIGS. 3, 4A, and 4B are schematic illustrations of multiple EVs in the form of electric buses parked at an exemplary depot. As illustrated in these figures, at least some of the parked EVs (or all the EVs) are connected to dispensers 60A, 60B, 60C, etc. located proximate each EV. Dispensers may be arranged in the depot such that parking of EVs in the depot can be maximized. As would be recognized by people skilled in the art, for relatively large fleets of EVs (and/or in expensive real-estate markets), increasing the number of EVs that can be simultaneously parked and charged in the depot (or increased parking density) may reduce cost and increase operational efficiency. The parking density of EVs may be increased by decreasing the size and/or the spacing between the dispensers (see FIG. 3) and/or by positioning the dispensers out from the path of the EVs (see FIGS. 4A, 4B). Sets of dispensers in the depot may be connected to a single PDS. That is, as illustrated in FIG. 3, dispensers 60A, 60B, and 60C of Row A may be connected to PDS 40A, dispensers 60A, 60B, and 60C of Row B may be connected to PDS 40B, and dispensers 60A, 60B, and 60C of Row C may be connected to PDS 40C. It should be noted that the illustrated number of dispensers in each row is only exemplary. That is, each row may include more or less number of dispensers than that illustrated. It should also be noted that the illustrated arrangement of dispensers (i.e., in a rectangular grid) are also exemplary. For example, in some embodiments, one or more PDSs may be clustered together at one location and dispensers arranged around the clustered PDSs, for example, in a circle.

In some embodiments, each PDS may be connected to (i.e., powered by) a separate PCS. That is, as illustrated in FIG. 3, PDS 40A may be connected to PCS 20A, PDS 40B may be connected to PCS 20B, and PDS 40C may be connected to PCS 20C. In some embodiments, multiple PCSs may be connected to the same PDS. Each PCS in the depot may be similar to PCS 20 (described previously), and each PDS in depot may be similar to PDS 40 (described previously). In some embodiments, a charge controller (located in depot, located at a remote location, etc.) may control the charging of the EVs parked in the depot (and connected to the different dispensers). The charge controller may selectively activate the different dispensers 60A, 60B, 60C in each row by sending instructions to the corresponding PDS. For example, with reference to FIG. 3, the charge controller may instruct the PDSs in each row to activate dispensers in the order 60A→60B→60C (or any other desired order). Based on these instructions, each PDS may selectively activate its contactors (as previously described) to power the dispensers connected to it in the desired order. That is, the EVs connected to dispensers 60A in Rows A, B, and C are first charged. As described previously, while charging an EV using dispenser 60A, the control unit of dispenser 60A acts as the master controller and instructs PCS 20A to direct power at the desired voltage (based, for example, on the SOC of the EV being charged) to the dispenser 60A. After charging the EV coupled to dispenser 60A in a row is complete, the corresponding PDS activates dispenser 60B to charge the EV connected to that dispenser. Thus, all the EVs connected to the dispensers are automatically charged while the EVs are parked at the depot. As explained previously, the EVs parked in the depot (and connected to dispensers) may be charged in any order. In some embodiments, the EVs may be charged based on a default schedule (e.g., first-in first-out or any other predetermined order). In some embodiments, the charge controller may be configured to change the default schedule of charging and reprioritize the charging order, for example, based on the operating schedule of the EVs. For example, the charge controller may change the default charging schedule to prioritize the charging of EVs that will be used soon even if they are connected to dispensers that will be activated later (based on the default schedule).

A PCS is significantly more expensive than a dispenser. In prior art charging systems, a single dispenser is connected to a PCS and used to charge an EV. Coupling multiple dispensers to a PCS (via a PDS) enables multiple EVs to be charged using a single PCS thus saving cost. Although only one dispenser (of the multiple dispensers coupled to the PCS) is activated at one time (and thus only one EV connected to the PCS is charged at one time), significant cost savings can be achieved. For example, multiple EVs parked overnight in a depot can be connected to a single PCS (via the PDS) and charged in sequence one after the other without having to physically disconnect one EV and connect another EV. Additionally, a PCS is physically much larger than a dispenser. Coupling multiple dispensers to a single PCS via a PDS enables the larger PCS to be positioned at a remote location in the depot while the smaller dispensers are distributed in the EV parking area thus increasing parking density. See FIGS. 3, 4A, and 4B. As would be recognized by people skilled in the art, in expensive real-estate markets, increasing the parking density of EVs reduces cost and increases operational efficiency.

While principles of the present disclosure are described with reference to specific embodiments, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:
1. An electric vehicle charging system, comprising:
a power control system configured to receive power from a utility grid;
a power distribution system configured to receive power from the power control system, wherein the power distribution system comprises a first contactor, a second contactor, and a control unit configured to selectively activate one of the first contactor and the second contactor to selectively direct power from the power control system to one of a first power dispenser and a second power dispenser by receiving information regarding a first electric vehicle coupled to the first power dispenser and a second electric vehicle coupled to a second power dispenser, the received information comprising a schedule of the first and second vehicles and an energy cost; and the first power dispenser and the second power dispenser coupled to the power distribution system, wherein the first contactor electrically couples the first dispenser to the power control system and the second contactor electrically couples the second dispenser to the power control system, wherein the first power dispenser and the second power dispenser are each configured to direct power to the first and/or second electric vehicle.

2. The system of claim 1, wherein the power control system is configured to receive AC power from the utility grid and output DC current to the power distributing system.

3. The system of claim 1, wherein at least one of the first and second power dispensers is configured to releasably couple with and direct power to an electric bus.

4. The system of claim 1, further comprising:
a third power dispenser and a fourth power dispenser coupled to the power distribution system, wherein the third power dispenser and the fourth power dispenser are each configured to direct power to an electric vehicle, and wherein the power distribution system is configured to selectively direct the received power to one of the first, second, third, and fourth power dispensers.

5. A method for charging electric vehicles, the method comprising:
releasably coupling a first power dispenser to a first electric vehicle and a second power dispenser to a second electric vehicle, wherein the first power dispenser is configured to electrically isolate the first electric vehicle from the second electric vehicle connected to the second power dispenser, wherein the first and second power dispensers are coupled to a power distribution system, and the power distribution system comprises a first contactor, a second contactor, and is coupled to a power control system;
electrically coupling, by the first contactor, the first dispenser to the power control system;
electrically coupling, by the second contactor, the second dispenser to the power control system;
receiving information regarding the first electric vehicle and the second electric, the information comprising a schedule of the first and second vehicles ;
directing power from the power control system to the power distribution system;
determining to charge the first electric vehicle prior to the second electric vehicle based on the received information; and
selectively directing power from the power distribution system to the first power dispenser without directing power to the second power dispenser.

6. The method of claim 5, further including:
determining that the first electric vehicle is charged; and
directing power to the second power dispenser without directing power to the first power dispenser based on the determination that first electric vehicle is charged.

7. The method of claim 5, wherein the received information regarding the first electric vehicle and the second electric vehicle comprises an indication to charge the first electric vehicle prior to the second electric vehicle.

8. The method of claim 5, wherein the received information further includes an indicated duration to charge the first electric vehicle and/or an indicated charge current for the first electric vehicle, and
wherein determining that the first electric vehicle is charged comprises directing the received power to the first dispenser coupled to the first electric vehicle for the indicated duration at the indicated charge current.

9. The method of claim 5, wherein the received information indicates a first period in time at which the first electric vehicle coupled to the first power dispenser and a second period in time at which the second electric vehicle coupled to the second power dispenser, and
wherein determining to charge the first electric vehicle prior to the second electric vehicle based on the received information comprises determining that the first period in time comes before the second period in time.

10. The method of claim 5, wherein the received information comprises a first state of charge of the first electric vehicle and a second state of charge of the second electric vehicle, and wherein determining to charge the first electric vehicle prior to the second electric vehicle is based on the first and second states of charge.

11. The system of claim 1, wherein the energy cost is an energy cost of a utility company.

12. A power distribution system configured to charge a first electric vehicle and a second electric vehicle, the power distribution system comprising:
a first power dispenser and a second power dispenser;
a first contactor and a second contactor, the first contactor electrically coupling the first power dispenser to a power control system and the second contactor electrically coupling the second power dispenser to the power control system; and
a control unit configured to:
receive power from the power control system;
receive information regarding the first electric vehicle coupled to the first power dispenser and the second electric vehicle coupled to the second power dispenser, the received information comprising a schedule of the first and second vehicles and an energy cost;
determine to charge the first electric vehicle prior to the second electric vehicle based on the received information;
selectively directing power to the first dispenser coupled to the first electric vehicle by activating the first contactor and deactivating the second contactor; and
as a result of determining that the first electric vehicle is charged, selectively directing power to the second dispenser coupled to the second electric vehicle by activating the second contactor and deactivating the first contactor.

13. The power distribution system of claim 12, wherein the received information regarding the first electric vehicle and the second electric vehicle comprises an indication to charge the first electric vehicle prior to the second electric vehicle.

14. The power distribution system of claim 12, wherein the received information further includes an indicated duration to charge the first electric vehicle and/or an indicated charge current for the first electric vehicle, and
wherein determining that the first electric vehicle is charged comprises directing the received power to the first dispenser coupled to the first electric vehicle for the indicated duration at the indicated charge current.

15. The power distribution system of claim 12, further comprising:
a third power dispenser and a fourth power dispenser;
a third contactor and a fourth contactor, the third contactor electrically coupling the third power dispenser to the power control system and the fourth contactor electrically coupling the fourth power dispenser to the power control system; and
the control unit further configured to selectively direct the received power to the one of the first, second, third, and fourth power dispensers.

16. The power distribution system of claim 12, wherein the received information indicates a first period in time at which the first electric vehicle coupled to the first power dispenser and a second period in time at which the second electric vehicle coupled to the second power dispenser, and wherein determining to charge the first electric vehicle prior to the second electric vehicle based on the received information comprises determining that the first period in time comes before the second period in time.

17. The power distribution system of claim 12, wherein the received information comprises a first state of charge of the first electric vehicle and a second state of charge of the second electric vehicle, and wherein determining to charge the first electric vehicle prior to the second electric vehicle is based on the first and second states of charge.

18. The power distribution system of claim 12, wherein the first power dispenser is configured to electrically isolate the first electric vehicle from the second electric vehicle connected to the second power dispenser.

19. The power distribution system of claim 12, wherein the control unit is configured to reprioritize a charging order of the first and second electric vehicles based on an operating schedule of the first and second electric vehicles.

20. The power distribution system of claim 12, wherein the energy cost is an energy cost of a utility company.

* * * * *